United States Patent
Fenile (10) Patent No.: US 12,077,387 B2
(45) Date of Patent: Sep. 3, 2024

(54) CONVEYOR SYSTEM

(71) Applicant: FERAG AG, Hinwil (CH)

(72) Inventor: Roberto Fenile, Wetzikon (CH)

(73) Assignee: FERAG AG, Hinwil (CH)

( * ) Notice: Subject to any disclaimer, the term of this patent is extended or adjusted under 35 U.S.C. 154(b) by 25 days.

(21) Appl. No.: 17/978,535

(22) Filed: Nov. 1, 2022

(65) Prior Publication Data
US 2023/0135404 A1    May 4, 2023

(30) Foreign Application Priority Data

Nov. 3, 2021  (CH) ................................. 70499/2021
Jul. 6, 2022   (CH) .................................... 809/2022

(51) Int. Cl.
*B65G 17/06*        (2006.01)
*B65G 17/20*        (2006.01)
*B65G 47/61*        (2006.01)

(52) U.S. Cl.
CPC ............. *B65G 17/06* (2013.01); *B65G 17/20* (2013.01); *B65G 47/61* (2013.01)

(58) Field of Classification Search
CPC ........ B65G 17/06; B65G 17/20; B65G 47/61; B65G 19/225; B65G 47/88; B65G 19/025; B65G 19/02
See application file for complete search history.

(56) References Cited

U.S. PATENT DOCUMENTS

| | | | |
|---|---|---|---|
| 1,556,724 A | | 10/1925 | Shaffer |
| 2,530,412 A | * | 11/1950 | Johnstone ............ B65G 19/225 |
| | | | 198/803.9 |
| 3,032,173 A | | 5/1962 | King |
| 3,048,123 A | | 8/1962 | Burmeister et al. |
| 3,160,263 A | * | 12/1964 | Lewis .................. B65G 19/225 |
| | | | 198/719 |
| 5,001,988 A | * | 3/1991 | Agathos .................. B60S 3/004 |
| | | | 104/172.3 |
| 5,056,438 A | | 10/1991 | Nozaki et al. |

(Continued)

FOREIGN PATENT DOCUMENTS

| | | |
|---|---|---|
| DE | 4023983 A1 | 1/1991 |
| DE | 92 02 325 U1 | 4/1992 |

(Continued)

*Primary Examiner* — Mark A Deuble
(74) *Attorney, Agent, or Firm* — Pauley Erickson & Swanson (57) ABSTRACT

A conveyor system for conveying articles, which conveyor system includes a transport device for transporting articles along a predefined path. The transport device includes at least one running rail and at least one running carriage which is attachable to the running rail. The running carriage is configured to run in a conveying direction (F) along the running rail and to convey at least one article. The conveyor system furthermore includes a drivable carrier device which is arranged at least in regions along the running rail and is intended for carrying along the running carriage of the transport device. The carrier device includes at least one carrier element with a freely rotatable carrier roller, wherein the freely rotatable carrier roller can be brought into engagement (E) with the running carriage in order to carry along the running carriage along the running rail.

15 Claims, 5 Drawing Sheets

(56) References Cited

U.S. PATENT DOCUMENTS

| | | | | |
|---|---|---|---|---|
| 8,646,595 | B2 * | 2/2014 | Miller | B65G 17/24 |
| | | | | 198/779 |
| 9,056,722 | B2 * | 6/2015 | Otto | B61B 10/025 |
| 2015/0266677 | A1 * | 9/2015 | Fenile | B65G 19/025 |
| | | | | 198/562 |
| 2018/0281751 | A1 * | 10/2018 | Belanger | B65G 19/225 |
| 2019/0367281 | A1 * | 12/2019 | Fazio | B65G 19/205 |

FOREIGN PATENT DOCUMENTS

| | | |
|---|---|---|
| DE | 203 17 972 U1 | 3/2005 |
| DE | 10 2005 006 455 A1 | 8/2006 |
| DE | 20 2008 007 095 U1 | 10/2009 |
| EP | 2 573 011 A1 | 3/2013 |
| EP | 3 186 036 | 7/2017 |
| WO | WO 2016/030273 A1 | 3/2016 |

* cited by examiner

CONVEYOR SYSTEM

CROSS-REFERENCE TO RELATED APPLICATIONS

Swiss Patent Application No. 070499/2021, filed 3 Nov. 2021 and Swiss Patent Application No. 000809/2022, filed 6 Jul. 2022, the priority documents corresponding to this invention, to which a foreign priority benefit is claimed under Title 35, United States Code, Section 119, and their entire teachings are incorporated, by reference, into this specification.

BACKGROUND OF THE INVENTION

Field of the Invention

The present disclosure relates to the field of conveyor technology. It relates to a conveyor system.

Discussion of Related Art

For the automatic conveyance of articles, in particular articles transported in a suspended fashion, along rails led through a space, the prior art has disclosed a multiplicity of systems. Typically, articles suspended on running carriages are carried along a transport rail by a carrier device which runs in parallel at least in regions, and which is driven and is in engagement with the running carriage. The known, conventionally hook-shaped carrier elements have to be actively taken out of engagement at a planned stopping station of the running carriage or when an obstruction is encountered.

DE 102005006455 A1 discloses a transport system for suspended articles, in particular for items of clothing suspended on hangers, having a transport rail, having a drive chain which is arranged so as to be movable in a conveying direction in the transport rail and which has downwardly projecting drivers, and having holding elements for the articles, which holding elements are guided in the transport rail, below the drive chain, by way of running rollers and which are movable in the conveying direction by means of the drive chain. The transport system is distinguished by the fact that the drivers are of bolt-like form, that the holding elements are mounted in the transport rail in pendular fashion only about one pair of running rollers and comprise upwardly protruding projections for engaging in the drive chain between two adjacent drivers, and that, between the transport rail and the holding elements, means are provided which prevent projection and driver from passing out of engagement in the presence of a predefined maximum inclination of the holding element relative to a normal with respect to the transport rail in a vertical transport plane spanned by the conveying direction.

DE2 0317972 U1 describes a suspended conveyor system having a conveyor rail, having a drivable conveyor device which is arranged above the conveyor rail, having pawl-type drivers which are attached to the conveyor device and which are oriented relative to the conveyor rail and which serve for transporting hanger hooks, which are situated displaceably on the conveyor rail, in a conveying direction, wherein each pawl-type driver comprises a carrier connected to the conveyor device and comprises a pawl, which pawl comprises a driver hook which follows in the conveying direction and which pawl is on the carrier by way of a pivot spindle which is arranged laterally with respect to and above the conveyor rail and at an acute angle of at most 60° with respect to the conveying direction.

EP 3186036 B1 describes a conveyor system for transporting articles, in particular goods, along a predefined path, which conveyor system includes a running rail and at least one running carriage which runs on said running rail and which is freely movable along the running rail, and furthermore includes a driven engagement device which extends at least in sections along the running rail and which includes a multiplicity of engagement elements which are movable along the running rail and which, for the purposes of controlling the movement of the at least one running carriage, can be brought into engagement with the running carriage.

SUMMARY OF THE INVENTION

The known carrier devices of conveying installations operate with carrier elements which, when an obstacle is encountered, release the engagement and fall back into an engagement basic position. The known systems operate here with hook-shaped carrier elements which are arranged adjustably between at least two positions.

The change in position between the engagement position and an open position is associated with an undesirable generation of noise because a rattling noise arises when changing back and forth between the two positions. Furthermore, the hook-shaped carrier elements have a tendency to become worn out locally.

It can be considered an objective of the disclosure to reduce the generation of noise by the carrier device.

A conveyor system according to the disclosure for conveying articles includes a transport device for transporting articles along a predefined path. The transport device is preferably a suspended conveyor.

In order to convey articles, the transport device includes at least one running rail and at least one running carriage which is attachable to the running rail. Good results in respect of quietness and directional stability can be achieved if the cross-sectional profile of the running rail includes at least three interconnected profile sections.

The running rail preferably comprises a first, laterally outwardly open profile section for receiving first rollers of the running carriage, a second, laterally outwardly open profile section for receiving second rollers of the running carriage, and a third profile section, which is open in the vertical direction, for receiving third rollers of the running carriage.

In a predefined variation, the first and the second profile sections of the running rail are arranged mirror-symmetrically with respect to a vertical center plane of the running rail. Such a construction of the rail and of the corresponding running carriage makes it possible to convey even heavy loads in a directionally stable manner and without lurching.

The running rail can be configured integrally here and produced by bending of a metal band or a metal strip by the first, second and third profile section each including a U-shaped cross-sectional profile, wherein the running rail comprises a connecting section with limbs connected thereto on both sides.

The running carriage is configured to run in a conveying direction along the running rail and to convey at least one article. The running carriage typically includes a U-shaped running carriage body which is configured for gripping the running rail and which includes a first and a second limb.

The first and the second limb can be connected to each other by a connecting section which preferably runs perpendicularly to the conveying direction of the running rail. Typically, the limbs are connected laterally to the connecting section, wherein the first limb comprises first rollers attached on the inner side thereof and the second limb comprises second rollers attached on the inner side thereof.

For a high degree of directional stability, the connecting section can comprise third rollers on a side facing the running rail. In this connection, the first and second rollers are preferably arranged upright (horizontally) and the third rollers are arranged lying down (vertically).

The conveyor system for conveying articles can include several variations of transport devices. A transport device in the form of a suspended conveyor can comprise running carriages with carrying elements. The carrying elements can be, for example, in the form of hangers, eyelets or hooks. In order to transport the articles, bags in the form of suspended bags or carrying bags can be arranged on the carrying elements.

In order to transport piece goods, the transport device can be in the form of a horizontal conveyor. In order to transport the piece goods, the horizontal conveyor can include running carriages which are suitable for receiving plates or baskets.

In a preferred variation, a running carriage includes at least one engagement element extending in the direction of the carrier device. The engagement element can be operatively connected to the connecting section and/or to one of the limbs of the running carriage. Alternatively, the carrier element may also be formed integrally with the running carriage.

Good results can be achieved if the engagement element is a shaped element from the group of the following elements or a combination thereof: cylinder pins, journals, bulges, cams or a protruding or edges. In a preferred variation, the carrier element is in the form of a cylinder pin, which extends laterally from the running carriage. Preferably, the carrier element extends away from the running carriage substantially perpendicular to the conveying direction of the running rail.

The conveyor system furthermore includes a drivable carrier device, which is arranged at least in regions along the running rail and is intended for carrying along the running carriage of the transport device. The carrier device can be suitable for carrying along the at least one running carriage at least in sections; for this purpose, it preferably includes a drivable and revolving chain.

In a preferred variation, the carrier device comprises a driven chain which revolves around two pinions and is guided in a chain guide arranged parallel to the transport device. Good results can be achieved if the chain is in the form of a roller chain or pin chain.

The chain can be guided in a chain guide so as to avoid sagging or deflection of the chain. The chain guide is preferably in the form of a channel made of plastic, for example polyethylene. Polyethylene has the advantage of being favorable, relatively abrasion-resistant and self-lubricating.

The carrier device furthermore includes at least one carrier element with a freely rotatable carrier roller, wherein the freely rotatable carrier roller can be brought into engagement with the running carriage in order to carry along the running carriage along the running rail. One of the advantages of a freely rotatable carrier roller in comparison to hook-shaped carrier elements is that it becomes worn out uniformly rather than just at certain points. Carrier rollers which include a free wheel and are therefore designed to be rotatable freely only in one direction are also conceivable.

The freely rotatable carrier roller can also be designed in such a manner that in particular the outer contour differs in the strictly mathematical sense from a circular-cylindrical shape. For example, outer contours in the form of a polygon are possible.

The lateral surface can also be configured in such a manner that it does not comprise a continuous outside diameter. The freely rotatable carrier roller can comprise a lateral surface which meanders between a circle which is further outwards with respect to the axle and a circle which is further inward with respect to the axle.

By means of the free revolution of the carrier roller, a random point on the lateral surface of the freely rotatably carrier roller is in engagement with the running carriage during each engagement. The engagement of the freely rotatable carrier roller preferably takes place temporarily. Temporarily should be understood as meaning the period of time in which the freely rotatable carrier roller is in engagement with the running carriage.

Furthermore, a carrier device with carrier elements with a freely rotatable carrier roller also makes it possible to reverse the conveying direction. Owing to the rotationally symmetrical contour of the carrier roller and the free rotatability, the carrier roller can revolve freely about said axle in both directions and can thus carry along the respective running carriage.

In one variation, the carrier device can include a carrier element with a freely rotatable carrier roller, which freely rotatable carrier roller is deformed in the circumferential direction in the blocked state of the running carriage. The lateral surface of the freely rotatable carrier roller can be elastically deformed temporarily at least partially in the circumferential direction by means of the engagement element of the running carriage in such a manner that that part of the lateral surface which faces towards the carrier element comes to lie against the carrier element.

In the initial state, the carrier roller preferably comprises a circular shape in the circumferential direction. Preferably, in the non-deformed state, there is a gap between the lateral surface of the freely rotatable carrier roller and the carrier element. In the blocked state of the running carriage, the carrier roller can be temporarily deformed along the circumferential direction by the carrier element in such a manner that the carrier roller assumes an asymmetrical shape in the deformed state.

By means of the deformation, that part of the lateral surface of the carrier roller which faces towards the carrier element can come to lie against the carrier element, as a result of which the rotatability can be temporarily prevented by means of a frictional fit. The gap between carrier roller and carrier element is typically 3 mm-5 mm, preferably 1 mm-3 mm.

In a preferred variation, the at least one carrier element with a freely rotatable carrier roller is connectable to a drivable pin chain. Good results can be achieved by the at least one carrier element being connectable to at least one pin of the pin chain by means of a spring connection. For this purpose, use is preferably made of a securing element, such as a lock washer or a circlip.

The carrier element can comprise a substantially C-shaped basic body. The basic body preferably comprises a first region with at least one bore in order to connect the basic body to at least one pin of the pin chain. For this purpose, the at least one pin of the pin chain can comprise a circumferential groove, and the at least one carrier element can comprise a bead corresponding to the groove.

The basic body preferably includes a second region on which an axle can be integrally formed. For easy exchangeability, the axle can include a snap connection by means of which the freely rotatable carrier roller can be arrested laterally, i.e., is secured axially, on the axle. The freely rotatable carrier roller is preferably arranged in a freely rotatable manner radially about the axle, but is fixed in a secure position axially along the axle. It is therefore prevented that the freely rotatable carrier roller, upon engaging with a running carriage, slips in the axial direction on the axle because of the force applied by the running carriage.

In order to achieve an offset-free and neat running of the carrier roller on the axle and thus to ensure a high degree of quietness, the freely rotatable carrier roller which is arranged on the axle can include a hub. Good results can be achieved if the hub comprises a metal sleeve which revolves freely about the axle of the carrier element.

Good results can be achieved if the freely rotatable carrier roller is elastically deformable. The freely rotatable carrier roller is thereby able to be brought into engagement with the running carriage by a force fit between the carrier roller and the running carriage being able to be produced by a temporary deformation, at least partially, of the freely rotatable carrier roller.

The temporary deformation is conventionally a deformation of the lateral surface of the freely rotatable carrier roller. Upon engagement of the freely rotatable carrier roller, the force fit is produced by a mixture of a temporary form fit and a frictional fit. In order to carry along a running carriage by means of the carrier device, at least one carrier element which is movable along the transport device is brought into engagement with at least one running carriage.

The fit between axle and freely rotatable carrier roller, and thus hardness of the material of the carrier roller are selected in such a manner that the freely rotatable carrier roller carries along the running carriage in a non-blocked state. The force fit between the freely rotatable carrier roller and the running carriage is achieved by the fact that the freely rotatable carrier roller is temporarily deformed partially. The shape of the local deformation of the freely rotatable carrier roller is produced from the geometry of the engagement element of the running carriage. The shape of the local deformation can preferably be a partial indentation. After release of the running carriage, the freely rotatable carrier roller substantially returns into the initial state.

In one variation, in a blocked state of the running carriage, for example due to a stopping element at a workstation, the freely rotatable carrier roller is deformed partially in such a manner that the freely rotatable roller rolls over the engagement element of the running carriage without carrying along the running carriage. Rolling over refers here to the rolling of the freely rotatable carrier roller on the engagement element of the running carriage. In a non-deformed initial state, the lateral surface of the freely rotatable carrier roller is substantially cylindrical. If the lateral surface is brought into engagement with a blocked running carriage, the lateral surface is elastically deformed preferably by the engagement element of the running carriage. However, the roller may also be brought into engagement with the running carriage without a determined engagement element of the running carriage. The freely rotatable carrier roller can thus be brought into engagement with the U-shaped running carriage body, for example with the one first and/or the one second limb. After rolling over the engagement element of the running carriage, the lateral surface of the freely rotatable carrier roller substantially returns into the cylindrical initial state.

Good results can be achieved if the freely rotatable carrier roller is substantially composed of an elastically deformable foamed plastic. In a preferred variation, the freely rotatable carrier roller is composed of polyurethane. One of the advantages of a freely rotatable carrier roller in contrast to a hook-shaped carrier element consists in that the carrier roller does not just become worn locally. Owing to the free rotatability, upon each engagement with the running carriage, a different point on the lateral surface of the freely rotatable carrier roller is in engagement with the running carriage. A freely rotatable carrier roller therefore has a longer service life than hook-shaped carrier elements.

In order to be able to rapidly and easily release individual carrier elements in the event of wear or in the event of a malfunction, said carrier elements are preferably connected to the chain by means of the groove and spring. In order to be able to efficiently release a carrier element from the chain, the at least one carrier element can comprise a receiving space. The receiving space can be in the form, for example, of a groove which is arranged on the basic body of the at least one carrier element.

Good results can be achieved if the receiving space is delimited by the pin chain. Such a receiving space, which is formed in the mounted state by the carrier element connected to the chain, by the groove of the carrier element and of the chain, can serve for receiving a tool. The receiving space can be configured to receive a tool in order to release the carrier element from the pin chain by means of the tool. The carrier element is preferably levered off the pin chain. This can take place, for example, by means of a commercially available screwdriver.

BRIEF DESCRIPTION OF SEVERAL VIEWS OF THE DRAWINGS

Aspects of the disclosure will be explained in more detail with reference to the exemplary embodiments shown in the following figures and the associated description. In the figures.

DESCRIPTION OF PREFERRED EMBODIMENTS

Figure 1:
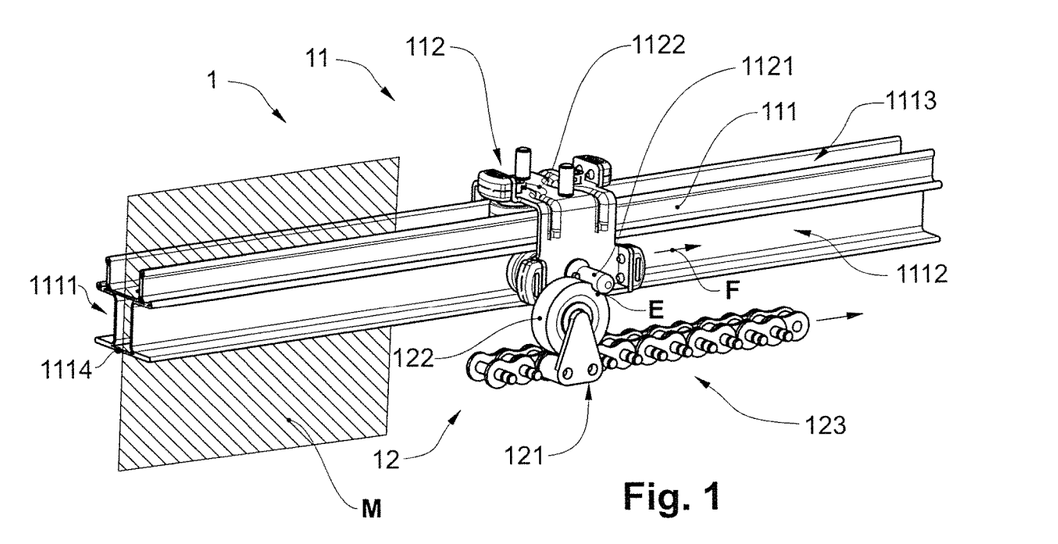
FIG. 1 shows a perspective side view of an exemplary embodiment of the conveying installation.

FIG. 1 shows an exemplary embodiment of the conveyor system 1 for conveying articles. The conveyor system 1 which is shown can be used as a horizontal conveyor for conveying plates or trays. Owing to the geometry of the running rail 111, the running carriage 112 which is in engagement therewith runs without tilting on the running rail 111.

The conveyor system 1 which is shown therefore includes a transport device 11 for transporting articles along a predefined path. The transport device 11 which is shown includes at least one running rail 111 and at least one running carriage 112 which is attachable to the running rail 111. The running rail 111 which is shown comprises a cross-sectional profile, with at least three interconnected profile sections 1111, 1112, 1113. The first profile section 1111 and the second profile section 1112 of the running rail 111 are arranged mirror-symmetrically to a vertical center plane M of the running rail 111. The running rail 111 which is shown can be formed integrally here and produced by bending a metal band or a metal strip by the first profile section 1111, second profile section 1112 and third profile section 1113 each including a U-shaped cross-sectional profile, wherein the running rail 111 comprises a connecting section 1114 with limbs 1115 connected thereto on both sides.

The running carriage 112 is configured to run in a conveying direction F along the running rail 111 and to convey at least one article. The running carriage 112 of the exemplary embodiment which is shown includes a U-shaped running body 1122, which is designed for gripping the running rail 111 and which includes a first limb 1123 and a second limb 1124. The first limb 1123 comprises first rollers attached on the inner side thereof and the second limb 1124 comprises second rollers attached on the inner side thereof.

The two limbs 1123, 1124 are connected here by means of a connecting section 1125. For a high degree of directional stability, the connecting section 1125 can comprise third rollers on a side facing the running rail 111. The drivable carrier device 12 which is shown and which is arranged at least in regions along the running rail 111 and is intended for driving the running carriage 112 of the transport device 11 includes at least one carrier element 121 with a freely rotatable carrier roller 122, wherein the freely rotatable carrier roller 122 can be brought into engagement E with the running carriage 112 in order to carry along the running carriage 112 along the running rail 111.

Figure 2:
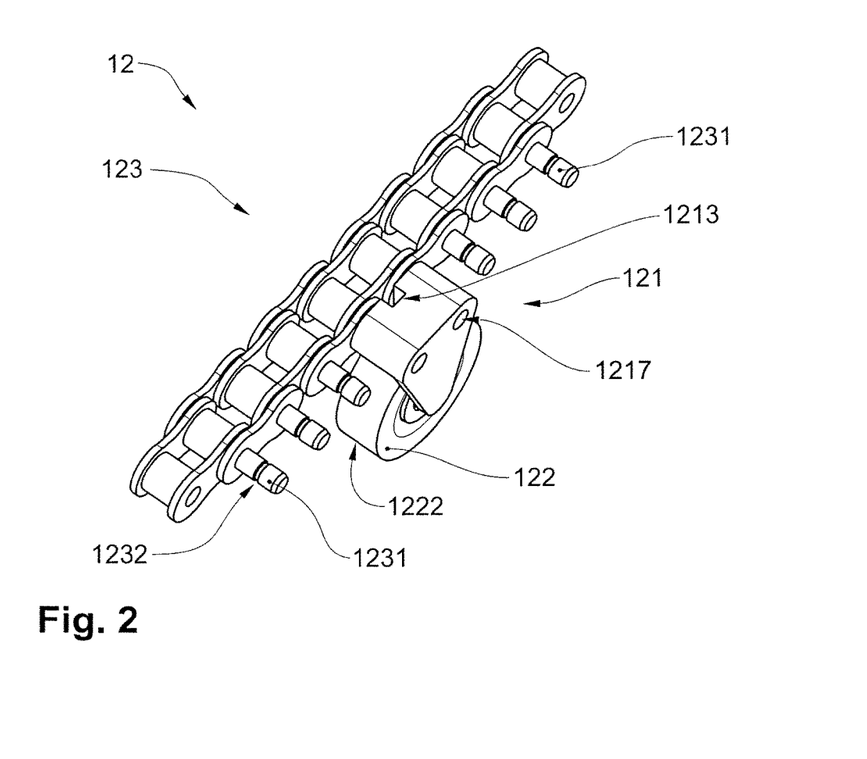
FIG. 2 shows a perspective top view of a carrier element of the exemplary embodiment of the conveyor system according to FIG. 1 with a freely rotatable carrier roller.

FIG. 2 shows an exemplary embodiment of the carrier element 121 which includes a receiving space 1213 and is connected to a pin chain 123. As can be seen from the figure, the receiving space 1213 which is in the form of a groove is delimited by the pin chain 123.

The receiving space 1213 is configured to receive a tool in order to release the carrier element 121 from the pin chain 123 by means of the tool, preferably by the carrier element 121 being levered off the pin chain. In the event of wear, individual carrier elements 121 can therefore be released rapidly and easily. The carrier element 121 can preferably be detached from the pin chain 123 by means of a commercially available screwdriver.

Figure 3:
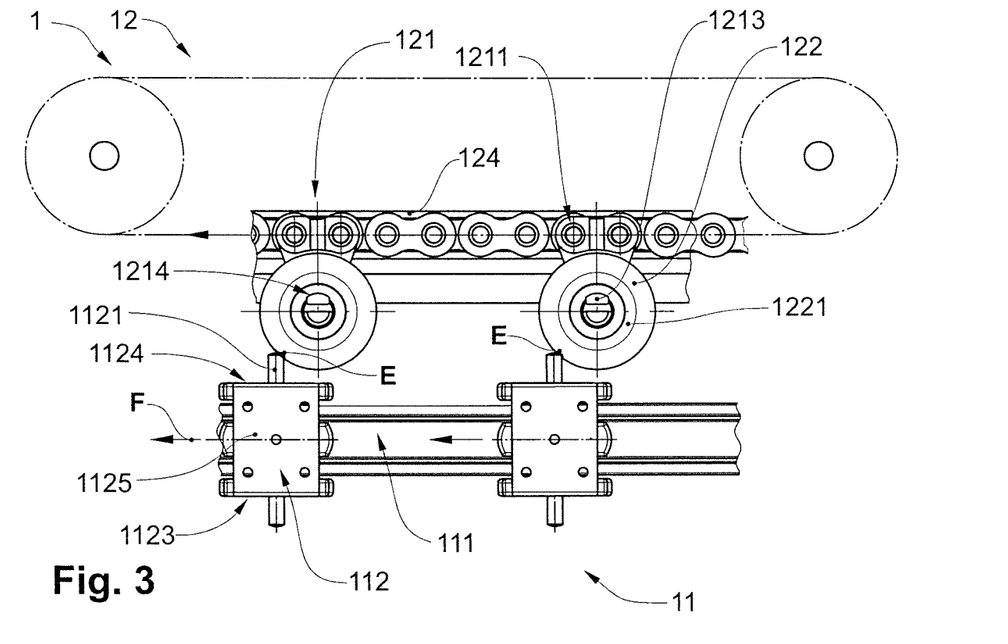
FIG. 3 shows a top view of the exemplary embodiment of the conveyor system according to FIG. 1.

FIG. 3 shows a top view of the exemplary embodiment of the conveyor system 1. The conveyor system 1 which is shown includes a drivable carrier device 12 which is arranged at least in regions along the running rail 111 and has a multiplicity of carrier elements 121, which are connected to pins 1231 of the revolving pin chain 123, for carrying along the running carriages 112 of the transport device 11.

Good results can be achieved if the chain is in the form of a roller chain or pin chain 123. The carrier elements 121 which are shown include freely rotatable carrier rollers 122 which can be brought into engagement E with the running carriage 112 in order to carry along the running carriage 112 in the conveying direction F along the running rail 111. As can be gathered from FIG. 3, the freely rotatable carrier rollers 122 which are shown are elastically deformable and can thereby be brought into engagement E with the running carriage 112 by a force fit being able to be produced between the carrier roller 122 and the running carriage 112 by a temporary deformation, at least partially, of the freely rotatable carrier roller 122, preferably in the form of a partial indentation.

The engagement E is achieved here by at least one engagement element 1121 protruding in the direction of the carrier device 12. The engagement element 1121 is preferably a shaped element from the group of the following elements or a combination thereof: cylinder pins, journals, bulges, cams or a protrusion or edges. In the exemplary embodiment which is shown, the engagement element 1121 is in the form of a cylinder pin which is connected to the running carriage or is integrally formed thereon.

Figure 4A:
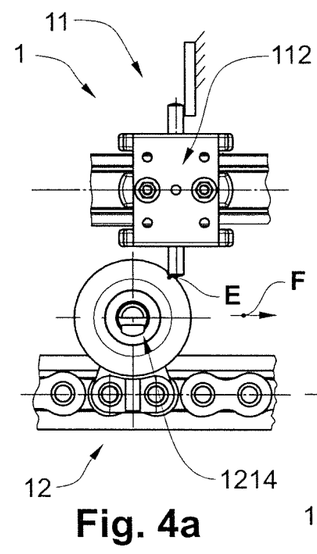
FIGS. 4a-4c show the rolling over of the freely rotatable carrier roller of the carrier element of the exemplary embodiment of the conveyor system according to FIG. 2.
Figure 4B:
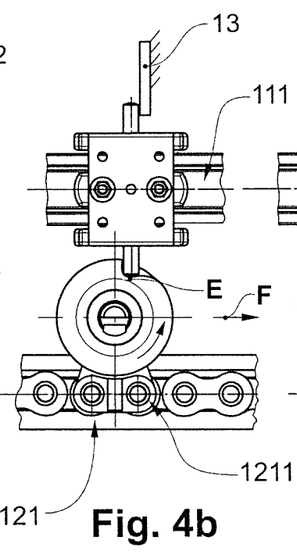
Figure 4C:
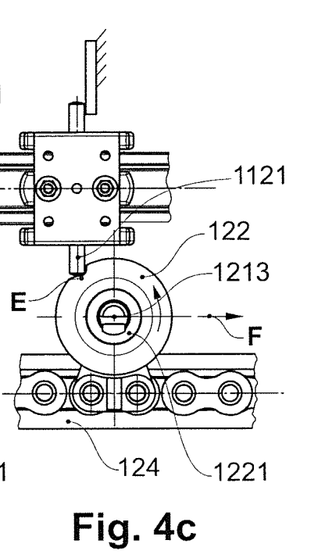

FIGS. 4a-4c show how the at least one freely rotatable carrier roller 122 rolls over the engagement element 1121 in the blocked state of the running carriage 112 without carrying along the running carriage 112. The freely rotatable carrier roller 122 which is shown is elastically deformable, and a force fit between the carrier roller 122 and the running carriage 112 is achieved by a temporary deformation, at least partially, of the freely rotatable carrier roller 122.

The fit between the axle 1212 and the freely rotatable carrier roller 122, and the hardness of the material of the freely rotatable carrier roller 122 are selected in such a manner that the freely rotatable carrier roller 122 carries along the running carriage 112 in a non-blocked state. In a blocked state of the running carriage 112, for example due to a stopping element 13 at a workstation, as shown in FIGS. 4a to 4c, the freely rotatable carrier roller 122 is deformed partially in such a manner that it rolls over the engagement element 1121 of the running carriage 112 without carrying along the running carriage 112.

After rolling over the engagement element 1121 of the running carriage 112, the freely rotatable carrier roller 122 likewise substantially returns into the initial state. One of the advantages of a freely rotatable carrier roller 122 in contrast to a hook-shaped carrier element consists in that the freely rotatable carrier roller 122 does not become worn exclusively locally. Owing to the free rotatability, upon each engagement E with the running carriage 112, a different point of the lateral surface 1222 of the freely rotatable carrier roller 122 is in engagement E with the running carriage 112. A freely rotatable carrier roller 122 therefore has a longer service life than the hook-shaped carrier elements.

Figure 5:
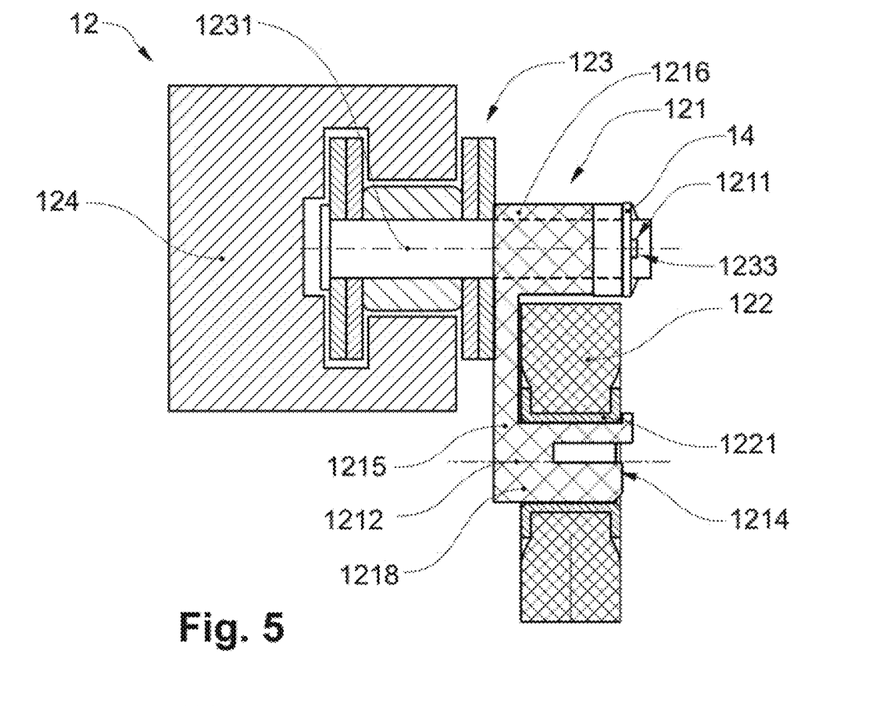
FIG. 5 shows a sectional illustration of an exemplary embodiment of the carrier element with a freely rotatable carrier roller.
Figure 6:
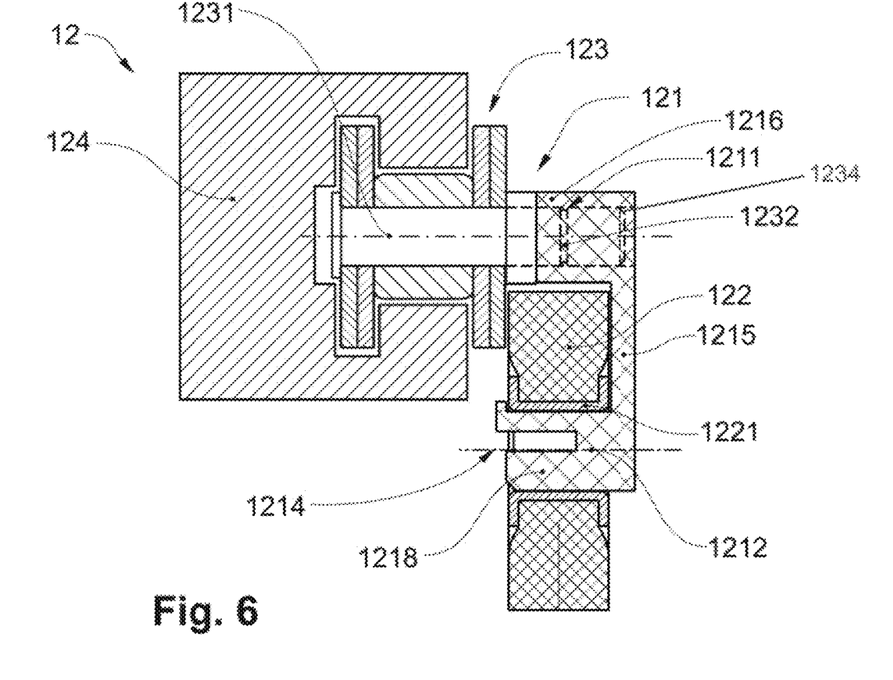
FIG. 6 shows a sectional illustration of a second exemplary embodiment of the carrier element with a freely rotatable carrier roller.

FIGS. 5 and 6 show two exemplary embodiments of the at least one carrier element 121. The exemplary elements which are shown of the carrier element 121 comprise a substantially C-shaped basic body 1215. The basic body 1215 comprises a first region 1216 with at least one bore 1217 in order to connect the basic body 1215 to at least one pin 1231 of the pin chain 123. As shown in FIG. 5, the at least one pin 1231 of the pin chain 123 can include a receptacle 1233, and the at least one carrier element 121 can be arrested by means of a securing element 14 in such a manner that it is inserted into the receptacle 1233. Alternatively, as shown in FIG. 6, the at least one pin 1231 of the pin chain 123 can include a circumferential groove 1232 and the at least one carrier element 121 can include a bead 1211 corresponding to the groove 1232.

In both exemplary embodiments, the basic body 1215 preferably includes a second region 1218 on which an axle 1212 is integrally formed. For simple exchangeability, the freely rotatable carrier roller 122 which is shown is in each case operatively connectable to the axle 1212 of the carrier element 121 by means of a snap connection 1214. In order to achieve neat running of the freely rotatable carrier roller 122 on the axle 1212 and therefore to ensure a high degree of quietness, the freely rotatable carrier rollers 122 which are shown each include a hub 1221 which is arranged on the axle 1212. The hub 1221 is preferably in the form of a metal sleeve which revolves freely about the axle 1212 of the carrier element 121.

Figure 7:
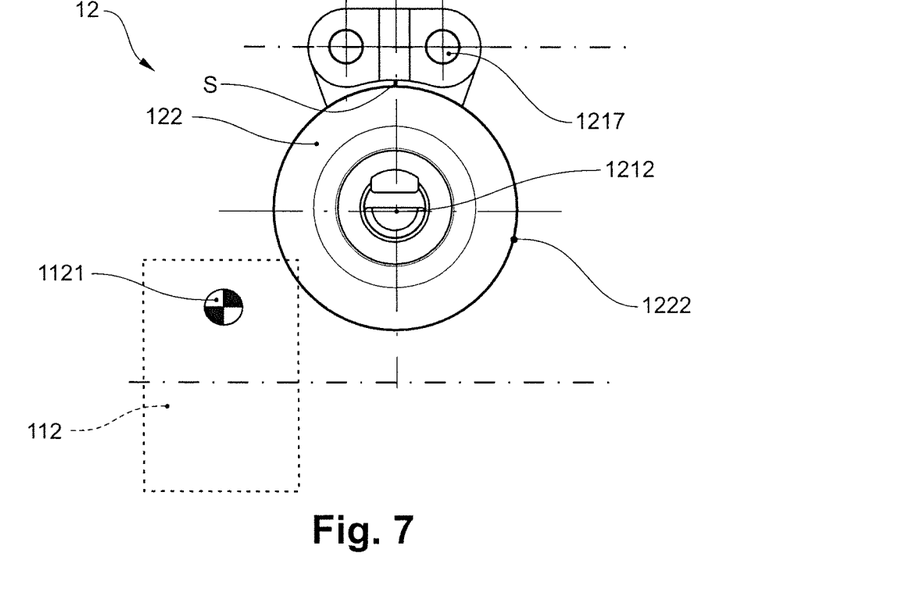
FIG. 7 shows a side view of a third exemplary embodiment of the carrier element with a freely rotatable carrier roller in the non-blocked state of the running carriage.
Figure 8:
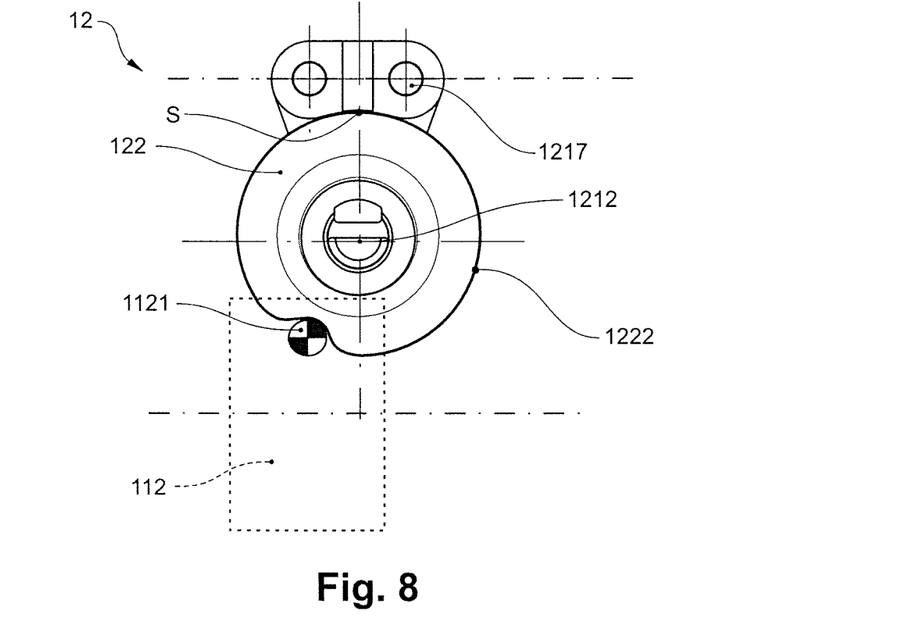
FIG. 8 shows a side view of the third exemplary embodiment of the carrier element according to FIG. 7 in the blocked state of the running carriage.

FIGS. 7 and 8 show a side view of a third exemplary embodiment of the carrier element with a freely rotatable carrier roller in the non-blocked state of the running carriage in FIG. 7 and in the blocked state of the running carriage in FIG. 8. The lateral surface 1222 of the exemplary embodiment which is shown of the freely rotatable carrier roller 122 is elastically deformed temporarily at least partially in the circumferential direction of the freely rotatable carrier roller 122 by means of the engagement element 1121 of the running carriage 122 in such a manner that that part of the lateral surface 1222 which faces towards the carrier element 121 comes to lie against the carrier element 121. As is apparent in FIG. 8, that part of the lateral surface 1222 which faces towards the carrier element 121 thereby comes to lie against the carrier element 121 and the rotatability is temporarily prevented by a frictional fit.

Figure 9:
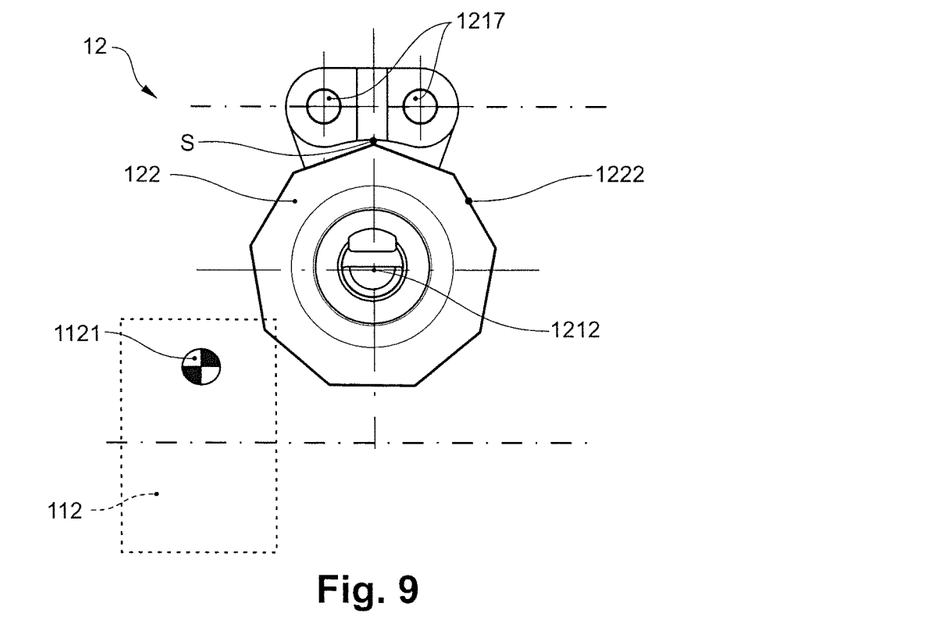
FIG. 9 shows a side view of a fourth exemplary embodiment of the carrier element with a polygonal freely rotatable carrier roller in the non-blocked state of the running carriage.
Figure 10:
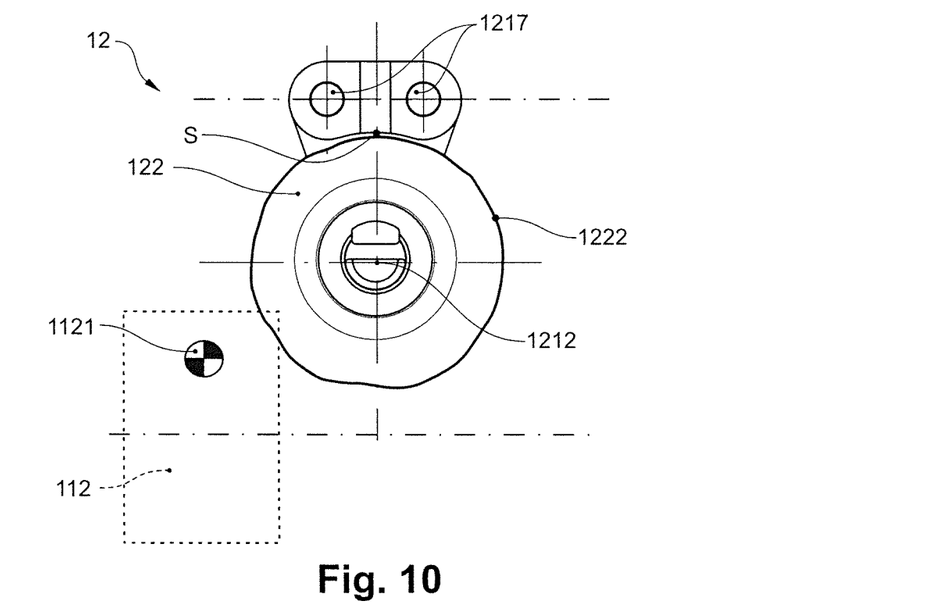
FIG. 10 shows a side view of a third exemplary embodiment of the carrier element with a freely rotatable carrier roller with an asymmetrical lateral surface in the non-blocked state of the running carriage.

FIGS. 9 and 10 show a side view of a fourth and fifth exemplary embodiment of the carrier element with a freely rotatable carrier roller in the form of a polygonal carrier roller in FIG. 9 and in the form of an asymmetrical carrier roller in FIG. 10. As can be seen from the figures, in the non-deformed state of the carrier roller 122, there is a gap S between the lateral surface 1222 of the freely rotatable carrier roller 122 and the carrier element 121. In the blocked state of the running carriage 112, the carrier roller 122 can be temporarily deformed along the circumferential direction by the carrier element 121 in such a manner that the carrier roller 122 assumes an asymmetrical shape in the deformed state. In the blocked state of the running carriage 112, the lateral surface 1222 of the exemplary embodiments which are shown of the freely rotatable carrier rollers 122 is elastically deformed temporarily at least partially in the circumferential direction of the freely rotatable carrier roller 122 by means of the respective engagement element 1121 of the running carriage 112 in such a manner that that part of the lateral surface 1222 which faces towards the carrier element 121 comes to lie at least partially against the carrier element 121.

It is claimed:

1. A conveyor system (1) for conveying articles, including a transport device (11) for transporting articles along a predefined path, the transport device comprising:
    at least one running rail (111) and at least one running carriage (112) which is attachable to the running rail (111) and is configured to run along the running rail (111) in a conveying direction (F) and to convey at least one article; and
    a drivable carrier device (12) which is arranged at least in regions along the running rail (111) and is intended for carrying along the running carriage (112) of the transport device (11) and which includes at least one carrier element (121) with a freely rotatable carrier roller (122), wherein the freely rotatable carrier roller (122) can be brought into engagement (E) with the running carriage (112) to carry along the running carriage (112) along the running rail (111);
    wherein in a non-blocked state of the running carriage (112) the freely rotatable carrier roller (122) is configured to carry along the running carriage (112), and in a blocked state of the running carriage (112) is configured to be partially deformed and roll over the engagement element (1121) of the running carriage (112) without carrying along the running carriage (112).

2. The conveyor system (1) as claimed in claim 1, wherein the freely rotatable carrier roller (122) is elastically deformable and can be brought into engagement (E) with the running carriage (112) by a force fit produced between the carrier roller (122) and the running carriage (112) by a temporary deformation, at least in regions, of the freely rotatable carrier roller (122), in the form of a partial indentation.

3. The conveyor system (1) as claimed in claim 1, wherein a lateral surface (1222) of the freely rotatable carrier roller (122) is elastically deformable temporarily at least in regions in the circumferential direction of the freely rotatable carrier roller (122) by an engagement element (1121) of the running carriage (112) so that part of the lateral surface (1222) which faces towards the carrier element (121) is configured to be brought into engagement with the carrier element (121).

4. The conveyor system (1) as claimed in claim 3, wherein that part of the lateral surface (1222) facing towards the carrier element (121) is configured to be brought into engagement with the carrier element (121) so that the rotatability is temporarily prevented by a frictional fit.

5. The conveyor system (1) as claimed in claim 1, wherein the running carriage (112) includes at least one engagement element (1121), that is configured as a shaped element from the group of the following elements or a combination thereof: cylinder pins, journals, bulges, cams or a protrusion or edges.

6. The conveyor system (1) as claimed in claim 1, wherein the carrier device (12) comprises a drivable pin chain (123), wherein the at least one carrier element (121) is connectable to the pin chain (123).

7. The conveyor system (1) as claimed in claim 6, wherein the at least one carrier element (121) is connectable to at least one pin (1231) of the pin chain (123) by a spring connection (1234).

8. The conveyor system (1) as claimed in claim 1, wherein the at least one pin (1231) of the pin chain (123) comprises a circumferential groove (1232), and the at least one carrier element (121) includes a bead (1211) corresponding to the groove (1232).

9. The conveyor system (1) as claimed in claim 1, wherein the at least one carrier element (121) includes a receiving space (1212) which is delimited by the pin chain (123) and is configured to receive a tool to release the carrier element (121) from the pin chain (123) by the tool.

10. The conveyor system (1) as claimed in claim 1, wherein the freely rotatable carrier roller (122) is substantially composed of an elastically deformable foamed plastic.

11. The conveyor system (1) as claimed in claim 1, wherein the freely rotatable carrier roller (122) includes a hub (1221) which includes a metal sleeve which revolves freely about an axle (1212) of the carrier element (121).

12. The conveyor system (1) as claimed in claim 1, wherein the freely rotatable carrier roller (122) is operatively connectable to an axle (1212) of the carrier element (121) by a snap connection (1214).

13. A carrier device (12) for carrying along a running carriage (112) of a transport device (11), which transport device (11), for transporting articles along a predefined path, includes at least one running rail (111) and at least one running carriage (112) which is attachable to the running rail (111) and is configured to run in a conveying direction (F) along the running rail (111) and to convey at least one article, wherein the carrier device (12) is drivable and is arranged at least in regions along the running rail (111) and, in order to carry along the running carriage (112) of the transport device (11), includes at least one carrier element (121) with a freely rotatable carrier roller (122), wherein the freely rotatable carrier roller (122) can be brought into engagement (E) with the running carriage (112) in order to carry along the running carriage (112) along the running rail (111), wherein in a non-blocked state of the running carriage (112) the freely rotatable carrier roller (122) is configured to carry along the running carriage (112), and in a blocked state of the running carriage (112) is configured to be partially deformed and roll over the engagement element (1121) of the running carriage (112) without carrying along the running carriage (112).

14. A method for conveying articles along a conveying direction (F), including the following steps
  a. providing a conveyor system (1) which includes a transport device (11) and a carrier device (12);
  b. bringing at least one carrier element (121) which is movable along the transport device (11) into engagement (E) with at least one running carriage (112), which carrier element (121) includes a freely rotatable carrier roller (122) which
     i. carries along the running carriage (112) in a non-blocked state of the running carriage (112), and
     ii. is partially deformed in a blocked state of the running carriage (112) and rolls over the engagement element (1121) of the running carriage (112) without carrying along the running carriage (112).

15. The method for conveying articles as claimed in claim 14, wherein, in a non-deformed initial state, a lateral surface (1222) of the freely rotatable carrier roller (122) is brought into engagement (E) with a blocked running carriage (112) and the lateral surface (1222) is elastically deformed by the engagement element (1121) of the running carriage (112) and, after rolling over the engagement element (1121) of the running carriage (112) returns substantially again into the initial state.

* * * * *